Nov. 25, 1941. L. L. LAUVE, JR Re. 21,958

ILLUMINATED SIGN

Original Filed Jan. 12, 1939

Inventor,
LOUIS L. LAUVE, JR.
by Cushman Darby & Cushman
Attys

Reissued Nov. 25, 1941

Re. 21,958

UNITED STATES PATENT OFFICE 21,958

ILLUMINATED SIGN

Louis L. Lauve, Jr., Baltimore, Md., assignor to The Lauv-Lite Corporation, Baltimore, Md., a corporation of Maryland Original No. 2,168,223, dated August 1, 1939, Serial No. 250,624, January 12, 1939. Application for reissue May 2, 1940, Serial No. 333,058

6 Claims. (Cl. 40—133)

The present invention relates to illuminated signs and is a continuation in part of my application Ser. No. 233,467, filed Oct. 5, 1938, now Patent No. 2,167,660, issued August 1, 1939, and pertains to substantially the same subject matter.

The general structure for this type of illuminated sign is usually a housing of some convenient shape or size, wherein a source of light may be retained and allow the light to be transmitted outwardly through transparent or partly transparent elements, which are positioned within small openings within the housing. The housing may take numerous forms, the simplest form being a box-like structure having a panel covering one side of the box in which a plurality of openings are made to receive the light transmitting element. The openings are arranged in the particular shape or manner, which will when equipped with the light transmitting element, give the desired lighting effect.

The light transmitting elements are made from material such as phenolic, or resinous compounds and like plastics similar to those sold under the trade names "Catalin" and "Lucite." One of the characteristics of this material is that when a light is applied to one end or along the side of an elongated bar, the bar tends to transport or carry the light to the end thereof. Another characteristic is that when it slightly heated it will become relatively resilient and flexible.

The primary object of the invention is to provide a light ray transmitting element that can be inserted from the outer side of the panel without additional securing means and which will not become loosened or dislodged by vibrations.

Another object of the invention is to provide an element which will produce a more uniform lighting effect than those now in present use.

A further object of the invention is to provide an element for transmitting and diffusing light in sign displays which will be a great deal more economical both in manufacture and installation.

While several of the objects have been specifically set forth above, other objects will appear from the following specification taken in connection with the drawing which forms a part of the application and in which.

Referring to the present embodiment of the invention which is for the purpose of illustration only there is provided a housing or casing comprising a side wall 4, a front panel 5, and a rear panel 7. The panel 5 is provided with a plurality of openings 6, which are of predetermined size for receiving the light transmitting element. These elements are held in position within the panel by suitable holding means, which will be hereinafter more fully described.

Figure 3:
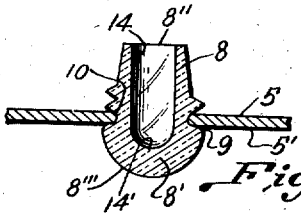
Fig. 3 is an enlarged sectional view of one form of light transmitting element.
Figure 4:
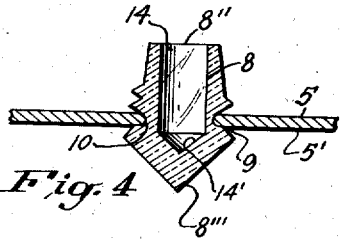
Fig. 4 is a modified view of the element similar to that shown in Fig. 3.

Referring now in particular to Figs. 3 and 4 the light transmitting element 8 is formed with an enlarged head member 8′ which is adapted to be exposed on the outer side of the panel 5. The body portion 8, which is of smaller diameter than the head, extends outwardly from the head member, and is tapered toward the outer end thereof. Extending about the element and adjacent the head, is a groove 10. Adjacent the head 8′ is a shoulder 9 adapted to bear against the outer surface 5′ of the panel 5, when the element is placed in position in the opening 6. Leading from the outer end 8″ of the element and extending inwardly toward the head is an opening, or chamber 14, of varying depth. The inner surface 14′ of the chamber 14 is of substantially the same shape as the outer surface 8‴ of the head. This particular structure aids in giving to the head, when illuminated, a more even lighting effect, and at the same time reduces the amount of light necessary to fully illuminate the element. The depth of the chamber 14 is determined by the nature and color of the particular plastic material used.

Figure 6:
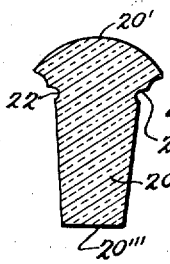
Fig. 6 is a vertical sectional view of a modified form of a light transmitting element.
Figure 7:
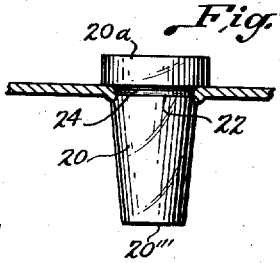
Fig. 7 is a view in elevation of a modified form of the element shown in Fig. 6.

Referring to Figs. 6 and 7, the structure of the element 20 is in many respects substantially the same as that just described for the element 8 shown in Figs. 3 and 4, except for the channel 14, and is adapted to be used in the same manner in the opening 6 of the panel. The element 20 is provided with a head 20′ and also a tapered body portion 20 extending outwardly from the head. Adjacent the head is a groove 22, which is substantially the same size or slightly smaller than the opening 6 in the panel and in which the element is adapted to be received. Adjacent the head of the element is a shoulder 24 which normally rests against the outer surface of the panel member when the element is properly installed.

Figure 5:
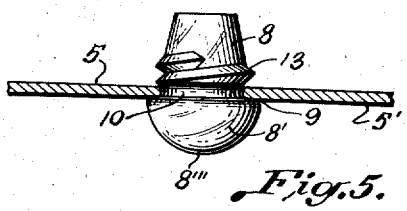
Fig. 5 is a side elevation of means used for installing and holding the element within the housing or panel 5.

The head may be of any desired form. Figs. 3 and 5 show a convexed or spherical head, Fig. 4 shows a conical shaped head, Fig. 6, a modified convex head, Fig. 7 shows a flat head and Fig. 8 shows a diagrammatically concave head at 26.

Figure 8:
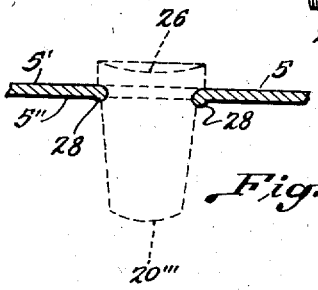
Fig. 8 is a fragmentary enlarged sectional view of the panel 5 taken along the line 8—8 of Fig. 1 showing diagrammatically still another modified form of the element shown in Fig. 6.

In forming the openings 6 within the panel 5, the area immediately surrounding the openings is slightly depressed or tapered inwardly toward the inner surface 5'' as best shown in Fig. 8 at 28. This is a decided advantage when inserting the elements within the openings, as the taper of the opening presents a relatively smooth surface in contact with the element wall.

Several methods are shown and described for installing and facilitating the installation of the elements within the openings. Referring first to Figs. 3, 4, and 5, the tapered body portion 8 has adjacent the head 8' a groove 10. Located adjacent the groove on the opposite side from the head is a thread 13 which is formed integral with the body portion 8. The purpose of this thread is to advance the element through the opening 6 to the groove 10, and is preferably short, being not over one and a half turns about the body of the element. The thread is designed to terminate at the outer edge of the groove 10 and be of such size as to tightly fit within the opening. This means for advancing the element through the opening is also applicable to the solid element 20 shown in Figs. 6 and 7.

When the elements are not provided with the thread as shown in Figs. 6 and 7, they may first be slightly heated until they become sufficiently elastic to be compressible in order to facilitate their insertion into the panel. In this method the tapered end of the element is inserted within the aperture 6, and the element is forced therethrough until the groove 22 registers with the inner edge of the aperture where it will normally be held in position by the recovery of the compressed body. In some instances it is helpful to apply to the element a lubricant of some character such as soap when forcing the element through the aperture which can be easily removed.

The panel 5 may also be constructed from a relatively flexible, or pliable material, such as thin sheet metal, cardboard, and etc. When materials of this nature are used for constructing the panel, the diameter of the aperture formed therein may be easily extended by the insertion of the light element. The aperture will regain substantially its previous form when the groove 10 about the light element is in registry with the aperture.

Regardless of the form of the element, the outer tapered end portion must be equal to, or less in diameter than the depth of the groove adjacent the head in which the element is normally retained.

The usual panel of this type requires the light transmitting elements to be inserted from the front and secured to the rear surface of the panel. This is very objectionable in that access must be had to the housing to reach the rear surface of the panel. These quarters are usually cramped and it requires a great deal of time, since a large number of light elements are required for each panel.

Figure 1:
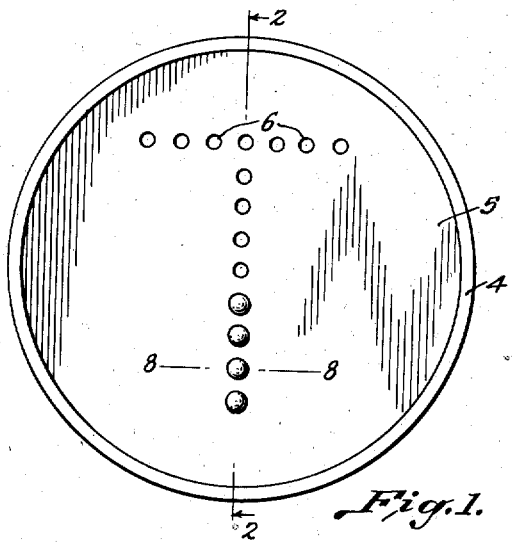
Figure 1 is a front elevation of the housing or casing.
Figure 2:
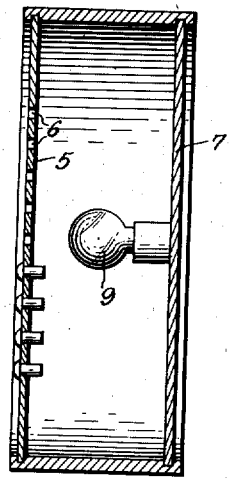
Fig. 2 is a sectional view taken along the line 2—2 of Fig. 1.

In use, any design or lettering effect may be outlined upon the panel by using these elements. When the body portions of the element are lighted from within the housing, the light is conveyed through the body of the element to the head portion which is located on the outer surface of the panel and presents a very brilliant lighting effect. The light source is usually supplied from suitable light bulbs 9 of any conventional design, and which are properly installed in the housing as shown in Figs. 1 and 2.

While the invention has been shown and described in a preferred form it is not intended that it be limited thereto as the scope of the invention is best defined in the appending claims.

I claim:

1. In an illuminated sign the combination of a sign panel having a front and back surface provided with an aperture therein having uninterrupted margins, an elastic light transmitting element having an enlarged head which is normally positioned adjacent the front face of the said panel and a circular tapered body portion extending outwardly from the back surface and substantially perpendicular thereto, a circumferential groove about the body portion adjacent the said head having substantially the same cross sectional diameter of the thickness of the said panel, the diameter of the body portion within said groove being substantially the same as the diameter of the aperture for normally positioning the said lighting element within the said panel, the said aperture having its front edge bevelled slightly inwardly toward the rear surface of the panel, a portion of the body lying between the tapered end and the immediately adjacent groove being substantially larger in diameter than the said aperture, whereby a portion of the said elastic tapered body of the lighting element is compressed by the bevelled edge of the aperture when inserted within the aperture for retaining the same therein when the said lighting element is normally positioned within said panel.

2. In combination, a sign support comprising, a retaining panel having an aperture therein having uninterrupted margins, a light transmitting element adapted to be supported within said aperture, said sign panel having a front and back surface, said light transmitting element having an enlarged head which is normally positioned adjacent the front surface of the said panel and a body portion extending outwardly from the back surface and substantially perpendicular thereto, a circumferential groove about the body portion of said element adjacent the head, the diameter of the body portion within said groove being substantially the same as the diameter of the aperture for normally positioning the said light element within the said panel, a retaining means carried by said element for retaining said element within the aperture, said element retaining means comprising a portion of the body immediately adjacent the groove and lying between the same and the outwardly extended end of the body being slightly larger in diameter than the said aperture, one of said retaining means being slightly elastic, thereby allowing the said light element to be advanced through the aperture to the groove.

3. In a sign, the combination of a panel provided with an opening therein having uninterrupted margins, and a light transmitting element including a head portion and a shank portion, the latter being insertable in said opening and the whole being of sufficient rigidity to permit handling as a unit, said head portion coming against the margins at the front face of the panel upon insertion of said shank portion and said shank portion being enlarged at the rear face of the panel due to expansion after insertion through said opening to provide a shoulder tightly engaged with the rear margins of said opening to lock said element in said opening and completely close the latter.

4. In a sign, the combination of a panel provided with an opening therein having uninterrupted margins, and a light transmitting element including a head portion and a shank portion, the latter being insertable in said opening and the whole being of sufficient rigidity to permit handling as a unit, said head portion coming against the margins at the front face of the panel upon insertion of said shank portion, said element being formed of material which softens upon the application of heat and which subsequent to heat application has expanded and hardened to provide an integral shoulder on said shank portion tightly engaged against the margins at the rear face of the panel whereby to tightly lock said element in said opening and to completely close the latter.

5. In a sign, the combination of a panel provided with an opening therein having uninterrupted margins, and a light transmitting element including a head portion and a shank portion, the latter being insertable in said opening and the whole being of sufficient rigidity to permit handling as a unit, said head portion coming against the margins at the front face of the panel upon insertion of said shank portion, said element being formed of material which softens upon the application of heat and which subsequent to heat application has expanded and hardened to provide an integral peripherally continuous shoulder on said shank portion tightly engaged against the margins at the rear face of the panel whereby to tightly lock said element in said opening and to completely close the latter.

6. In a sign, the combination of a panel provided with an opening therein having uninterrupted margins, and a light transmitting element including a head portion and a shank portion, the latter being insertable in said opening and the whole being of sufficient rigidity to permit handling as a unit, said head portion coming against the margins at the front face of the panel upon insertion of said shank portion and the shank portion having an integral shoulder tightly engaged against the margins at the rear face of the panel whereby to tightly lock said element in said opening and completely close the latter, said element being formed of material which softens upon the application of heat thereby permitting the insertion of said shoulder through said opening, the shoulder thereupon recovering to engage the rear margins of said opening.

LOUIS L. LAUVE, JR.